United States Patent [19]

Austin et al.

[11] 3,793,178
[45] Feb. 19, 1974

[54] ELECTROLYTIC FLOTATION APPARATUS

[75] Inventors: Eric Paul Austin, Sandbach, England; Geoffrey David Kemp, Bramalea, Ontario; Fernando Antonio Francesca Modesto Tonelli, Windsor, Ontario, both of Canada; Ian Marshall, Shaw, England

[73] Assignee: Simon-Hartley Limited, Staffordshire, England

[22] Filed: May 1, 1972

[21] Appl. No.: 248,988

[30] Foreign Application Priority Data
May 8, 1971 Great Britain.................... 14183/71

[52] U.S. Cl................... 204/272, 204/149, 204/275, 210/44, 210/221
[51] Int. Cl.............................................. B01k 3/02
[58] Field of Search ... 204/149, 186, 272, 275, 302; 210/44, 198 R, 221

[56] References Cited
UNITED STATES PATENTS
3,479,281  11/1969  Kindai et al. ....................... 204/149
1,161,750  11/1915  Strohmenger...................... 204/275
3,642,618  2/1972  Silva ............................... 204/149 X
3,505,188  4/1970  Pan.................................. 204/275 X
3,701,723  10/1972  Cole et al. ....................... 204/302 X FOREIGN PATENTS OR APPLICATIONS
145,215  5/1962  U.S.S.R............................. 204/302

Primary Examiner—John H. Mack
Assistant Examiner—W. I. Solomon
Attorney, Agent, or Firm—Norris & Bateman

[57] ABSTRACT

Flotation apparatus of the kind wherein a liquid to be treated, such as activated sludge for example, is caused to flow through a tank and subjected to treatment by gas bubbles generated by electrolytic action, whereby suspended materials, usually but not necessarily solids, in the liquid are carried to the surface of the tank by said bubbles to form a layer of thickened material, and including means for removing the thickened material from the surface of the liquid contained within the tank, characterised in that the liquid to be treated is introduced into the tank by flow through at least one elongated tube of conducting material which defines a cathode with respect to an anode mounted within said tube and which extends substantially over the length thereof.

10 Claims, 3 Drawing Figures

PATENTED FEB 19 1974 3,793,178

ELECTROLYTIC FLOTATION APPARATUS

This invention concerns flotation apparatus of the kind (hereinafter termed of the kind referred to) wherein a liquid to be treated, such as activated sludge for example, is caused to flow through a tank and subjected to treatment by gas bubbles generated by electrolytic action, whereby suspended materials, usually, but not necessarily solids, in the liquid are carried to the surface of the tank by said bubbles to form a layer of thickened material, and including means for removing the thickened material from the surface of the liquid contained within the tank.

According to the present invention flotation apparatus of the kind referred to is characterised in that the liquid is introduced into the tank by flow through at least one elongated tube of conducting material which defines a cathode with respect to an anode mounted within said tube and which extends substantially over the length thereof.

The invention will be further apparent from the following description with reference to the several figures of the accompanying drawing which show, by way of example only, one form of apparatus, of the kind referred to embodying the invention.

Figure 3:
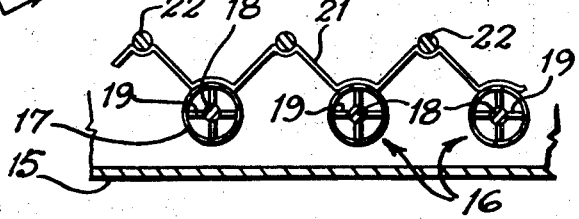
FIG. 3 shows a fragmentary cross-section on an enlarged scale on the line III—III of FIG. 1.

Referring now to the drawing, it will be seen that the apparatus essentially comprises a tank, generally indicated at 10, comprised by side walls 11 and 12, end walls 13 and 14 and a base 15. The side wall 11 is of substantially greater height than the side wall 12 whereby the base 15 is inclined and rises from the botton of the wall 11 to the bottom of the wall 12. Entering the tank 10 at the base of the wall 11 are a plurality of spaced parallel electrode assemblies, generally indicated at 16. As best seen from FIG. 3, each of the electrode assemblies 16 is essentially comprised by an outer tube 17 formed from an electrically conducting material and having an electrically conducting rod 18 concentrically mounted therein by means of insulating support members 19. The tubes 17 forming part of the electrode assembly 16 extend substantially over the width of the inclined base 15 of the tank and terminate with their open ends in the vicinity of the side wall 12. As can best be seen from FIG. 1, the rods 18 extend substantially over the length of the tubes 17, and the lower ends of the tubes 17 are closed but communicate with feed pipes 20 whereby the liquid to be treated can be introduced into the tank 10 by flow through the annular spaces formed between the rods 18 and tubes 17. The feed pipes 20 are fed from a common manifold 20a.

The tubes 17 and rods 18 are connected to a source of electrical supply whereby they constitute cathodes and anodes, respectively.

Mounted above and between each adjacent pair of electrode assemblies 16 by means of insulating supports 21, and extending parallel therewith is a further rod 22 of electrically conducting material. The rods 22 are connected to an electrical source so as to constitute with the tubes 17 a further electrode system, the rods 22 forming anodes and the tubes 17 forming cathodes.

In use, as the liquid to be treated flows through the tube 17, suspended materials therein are caused to flocculate under the influence of the electrical field which exists between the rods 18 and tubes 17. Gas bubbles are generated within the tube 17 by electrolytic action and tend to attach themselves to the flocculated material with the result that as the liquid being processed emerges into the tank 10 at the open ends of the tubes 17 much of the flocculated material rises to the surface of the tank carried by the gas bubbles. Additional gas bubbles are generated in the base of the tank by electrolytic action at the electrode system constituted by the tubes 17 and rods 22, and attach themselves to suspended materials which would otherwise tend to remain in the body of the tank 10 and thereby carry additional material to the surface. Furthermore, the electrode system constituted by the tubes 17 and rods 22 provides a continuous supply of gas bubbles substantially over the whole cross-section of the tank to maintain the material which has floated to the surface at this location. The liquid leaves the tank 10 through an outlet pipe 40.

Means to remove thickened material from the surface of the liquid contained within the tank 10 is provided and comprises endless chains 30 supported on sprocket wheels 31 at opposite sides of the tank 10, there being a plurality of spaced transversely extending scraper blades 32 between the two chains 30 on the opposite sides of the tank.

Figure 2:
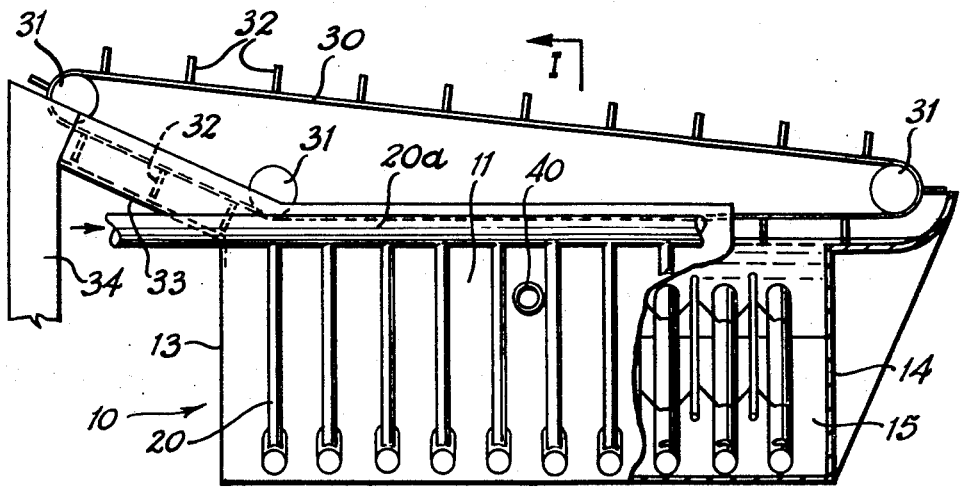
FIG. 2 shows a partly broken away and partially sectioned side elevation of the apparatus seen in the direction of the arrow A on FIG. 1.
Figure 1:
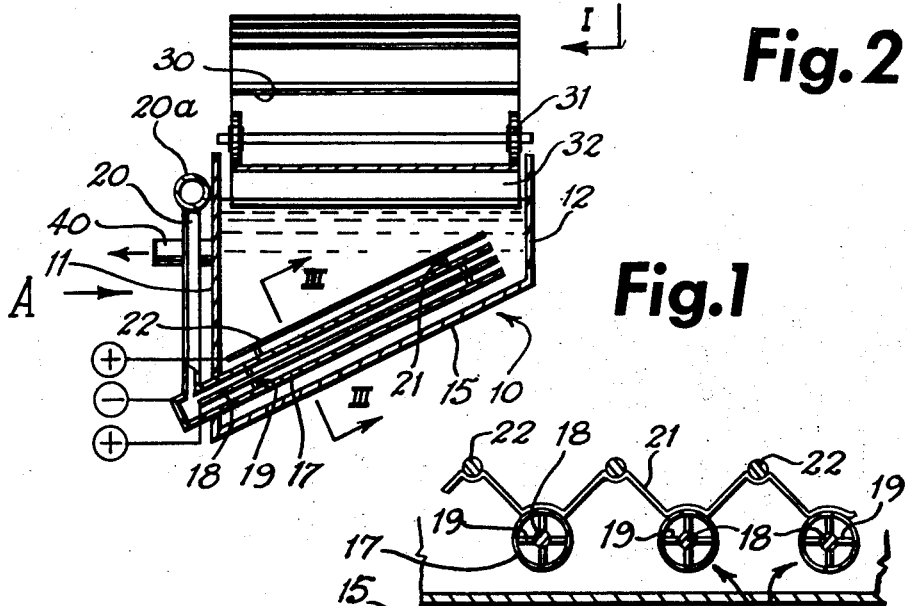
FIG. 1 shows a transverse cross-section through the apparatus substantially on line I—I of FIG. 2.

The chains are adapted to be driven in the direction wherein the lower flight moves from right to left in FIG. 1 so that the scraper blades 32 whose lower edges dip into the upper layer of the tank contents are drawn longitudinally of the tank to gather thickened material and move it towards an inclined upper terminal portion 33 of one of the end walls, 13. The sprocket wheels 31 are so disposed that adjacent the end of the tank 10 the blades 32 travel in an inclined direction to draw the collected sludge material over the portion 33 to drop from the end thereof into suitable collecting means 34.

It will be appreciated that it is not intended to limit the invention to the above example only, many variations such as might readily occur to one skilled in the art, being possible without departing from the scope thereof.

Thus, for example, the tank 10 need not have an inclined bottom and the open ends of the tubes 17 may communicate with the interior of the tank at any suitable position. Preferably the tubes 17 are mounted in an inclined direction so as to prevent the accumulation of large pockets of gas in the upper region of their cross-section.

The tubes 17 need not be located within the body of the tank and may merely communicate with the interior of the tank at their open ends in which case, the means in the tank for generating gas bubbles would need to comprise an electrode system consisting of both anodes and a cathode or cathodes not constituted by the tubes 17.

Again, for example, the means for generating gas bubbles within the body of the tank need not be comprised of an electorde system but may consist of an air diffusing arrangement or other known equipment.

What is claimed is:

1. Flotation apparatus comprising means defining a tank, means for introducing material to be treated into the tank comprising a plurality of electrically conductive elongated tubes each having a discharge end within the lower part of the tank and means for feeding said liquid into the other ends of said tubes whereby said liquid flows the entire lengths of said tubes before discharge into the tank, electrically conductive electrodes extending within the tubes substantially the length of each tube, each said electrode being electrically insulated from its surrounding tube, and means for applying an electrical potential between each said tube and the electrode there within, each said tube defining a cathode and the associated electrode defining an anode whereby all of said liquid is subjected to electrolytic action during passage along said tubes and prior to discharge into said tank, and means mounting each tube to be inclined upwardly from the region it receives said liquid so that its discharge end is located within the tank at a higher level than said other end thereof.

2. Flotation apparatus according to claim 1 wherein the or each elongated tube extends within the tank and lies above and parallel with a sloping base to the tank.

3. Flotation apparatus according to claim 1 including means for removing thickened material from the surface of the liquid contained within the tank comprising a plurality of transversely extending scraper blades arranged with their lower edges dipping into the surface of the contents of the tank and adapted to be driven longitudinally thereof.

4. Flotation apparatus as defined in claim 1, wherein substantially the entire inclined length of each tube is within said tank.

5. Flotation apparatus as defined in claim 4, wherein a second anode is mounted within said tank adjacent and above said tube and means is provided for establishing an electrical potential between said second anode and said tube.

6. Flotation apparatus comprising a tank, means for introducing material to be treated into the tank comprising a plurality of electrically conductive elongated tubes each extending within the tank for a major portion of its length and having a discharge end within the lower part of the tank and means for feeding said liquid into the other ends of said tubes whereby said liquid flows the entire lengths of said tubes before discharge into the tank, electrically conductive electrodes extending within the tubes substantially the length of each tube, each said electrode being electrically insulated from its surrounding tube, means for applying an electrical potential between each said tube and the electrode within, each said tube defining a cathode and the associated electrode defining a first anode whereby all of said liquid is subjected to electrolytic action during passage along said tubes and prior to discharge into said tank, an electrically conductive second anode mounted above and extending substantially parallel to each said tube within said tank, and means for applying an electrical potential between each second anode and the associated tube.

7. Flotation apparatus according to claim 6 including means for removing thickened material from the surface of the liquid contained within the tank comprising a plurality of transversely extending scraper blades arranged with their lower edges dipping into the surface of the contents of the tank and adapted to be driven longitudinally thereof.

8. Flotation apparatus as defined in claim 6, wherein each said tube is inclined within the tank so that its discharge end is located at a higher level within the tank.

9. Flotation apparatus as defined in claim 6, wherein a common liquid inlet header is provided and connected to each tube by individual substantially vertical conduits.

10. Flotation apparatus as defined in claim 6, wherein said second anodes are located in laterally displaced positions relative to the tubes in the tank.

* * * * *